United States Patent
Shin et al.

(10) Patent No.: US 8,753,490 B2
(45) Date of Patent: Jun. 17, 2014

(54) ELECTROLYZER FOR PRODUCING SODIUM HYPOCHLORITE

(75) Inventors: Ki-Ha Shin, Goyang-si (KR); Il-Kyung Seo, Goyang-si (KR); Yoon-Seok Shin, Goyang-si (KR)

(73) Assignee: Unitech Co., Ltd, Incheon (KR)

( * ) Notice: Subject to any disclaimer, the term of this patent is extended or adjusted under 35 U.S.C. 154(b) by 14 days.

(21) Appl. No.: 13/580,454

(22) PCT Filed: Feb. 16, 2011

(86) PCT No.: PCT/KR2011/001019
§ 371 (c)(1),
(2), (4) Date: Aug. 22, 2012

(87) PCT Pub. No.: WO2011/115370
PCT Pub. Date: Sep. 22, 2011

(65) Prior Publication Data
US 2013/0026034 A1     Jan. 31, 2013

(30) Foreign Application Priority Data
Mar. 15, 2010   (KR) .................. 10-210-0022982

(51) Int. Cl.
| C25C 7/00 | (2006.01) |
| C25C 7/02 | (2006.01) |
| C25B 1/26 | (2006.01) |
| C25B 1/04 | (2006.01) |
| C25B 9/18 | (2006.01) |
| C25B 15/00 | (2006.01) |

(52) U.S. Cl.
USPC ........ 204/278.5; 204/242; 204/280; 204/285; 204/286.1; 204/297.01; 204/193; 204/194

(58) Field of Classification Search
CPC .............. C25C 7/00; C25C 7/02; C25B 1/04; C25B 1/26; C25B 15/00; C25B 9/18
USPC .................. 204/242, 278.5, 280, 285, 286.1, 204/297.01
See application file for complete search history.

(56) References Cited

U.S. PATENT DOCUMENTS 3,791,947 A * 2/1974 Loftfield .................. 205/500

FOREIGN PATENT DOCUMENTS

| JP | 2001-009455 A | 1/2001 |
| JP | 2005-082835 A | 3/2005 |

(Continued)

OTHER PUBLICATIONS

English Translation of KR10-20100005998 to Heo, Seong; (2010).*

(Continued)

*Primary Examiner* — James Lin
*Assistant Examiner* — Zulmariam Mendez
(74) *Attorney, Agent, or Firm* — Lexyoume IP Meister, PLLC

(57) ABSTRACT

The present invention relates to an electrolyzer for producing sodium hypochlorite by electrolyzing brine such as salt water or seawater and the like, and more specifically to a horizontal non-membrane type electrolyzer of a new structure which can maintain a constant interval among electrode plates without using a welding means or an adhering means on the inside of a housing by including a separator for dividing an inner space of a hollow type housing into a plurality of electrode chambers; the electrode plates which are arranged in parallel to each other in the constant interval within a rectangular space part of the separator; and a fixing bar for fixing the separator to an inner wall of the housing.

4 Claims, 5 Drawing Sheets

(56) References Cited

FOREIGN PATENT DOCUMENTS

KR 10-0275504 B1 4/2001
KR 10-0999586 B1 12/2010

OTHER PUBLICATIONS

English Translation of Korean Reference KR Publication No. 10-20000026861 to Kim; 2000.*

* cited by examiner (A)

(B)

(A)

(B)

ELECTROLYZER FOR PRODUCING SODIUM HYPOCHLORITE

TECHNOLOGY AREA

This invention relates to an electrolyzer or electrolytic cell designed for producing sodium hypochlorite by electrolyzing brine, such as seawater, salt water and the like. In particular, the present invention relates to an electrolytic cell with a novel structure that can maintain electrode plates without requiring any welding work or adhesives inside a hollow housing by having separators dividing the inner space of the hollow housing into multiple electrode chambers, electrode plates that are arranged at certain intervals inside a rectangular space penetrating the separators, and fixation bars fixating the separators on inner walls of the housing.

BACKGROUND OF TECHNOLOGY

Sodium hypochlorite (NaOCl) is a highly safe colorless or light greenish yellow liquid with properties such as powerful disinfection, deodorization, and bleaching action. Thus, it is widely used for rinsing fruits, vegetables, cookware, and tableware; treating waste water and sewage; and disinfecting coolants used for boilers and power generation plants.

Sodium hypochlorite is generated by electrolyzing salt water, sea water, or natural or synthetic solutions containing sodium chloride (hereinafter referred to as "brine"). In general, electrolysis of brine with an electrolysis device yields chlorine ($Cl_2$) by oxidation at an anode, and sodium hydroxide (NaOH) and hydrogen ($H_2$) by reduction at a cathode. Further, the yielded sodium hydroxide (NaOH) and chlorine ($Cl_2$) react to yield sodium hypochlorite.

In general, devices used industrially to produce sodium hypochlorite using the above described electrolytic reactions are composed of brine supply devices and electrolytic cells electrolyzing brine. To date, various types of electrolytic cells have been developed to improve efficiency of electrolysis.

Figure 1:
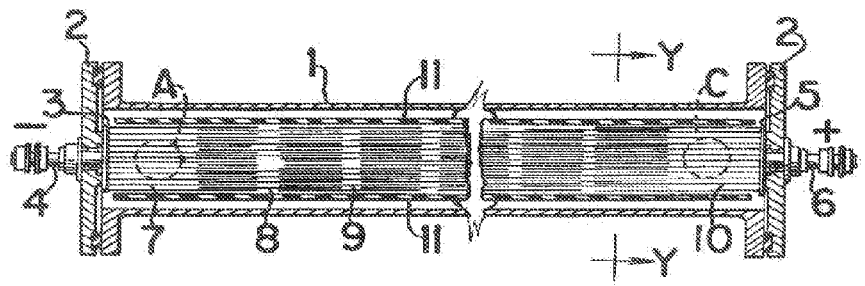

As an example of conventional electrolytic cells, U.S. Pat. No. 4,372,827 (registered on 2 Aug. 1983) discloses a horizontal diaphragm-free electrolytic cell as illustrated in FIG. 1 which is included herein. Referring to FIG. 1, this electrolytic cell consists of a polyvinyl chloride (PVC) housing (1) flanked by covers (2) at both ends with a cathode terminal (3) and its connector (4) installed at one end, and an anode terminal (5) and its connector (6) installed at the other end. In addition, the anode (7) of the first cell assembly is in contact with the cathode terminal (3) such that the area indicated by reference numeral 8 in FIG. 1 becomes anodic and the area indicated by reference numeral 9 which is separated from the next cell becomes cathodic. Multiple middle cells are arranged serially in this way until the anode (10) of the last cell comes in contact with the anode terminal (5).

However, in electrolytic cells with the above described structure, electrode plates forming each cell are linked with separators (11) by using joint bolts, making the entire structure very complicated. Thus, it is very difficult to maintain a regular or constant interval between the electrode plates. In particular, insufficient discharge of hydrogen gases resulting from the electrolysis may raise safety concerns by putting the housing at a risk of explosion.

Figure 2:
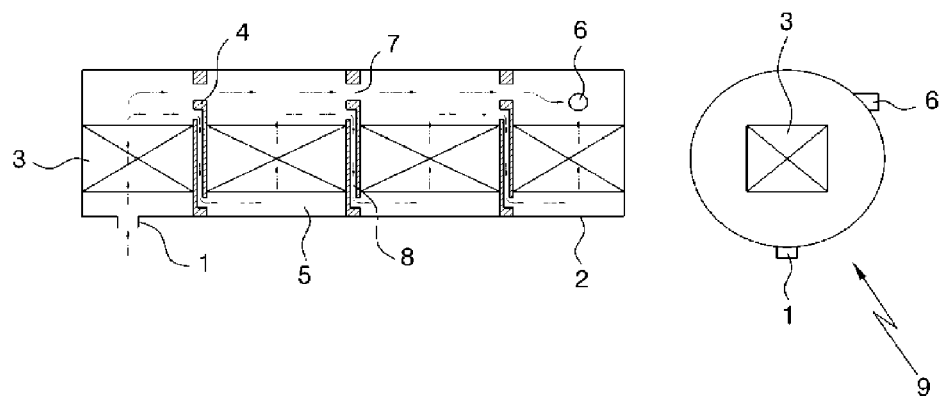

Korean patent number 592331 (registered on 15 Jun. 2006) discloses an electrolytic cell with a structure as illustrated in FIG. 2 included herein. Referring to FIG. 2, the electrolytic cell (9) consists of a cylindrical case (2) equipped with a brine supply pipe (1) and a hydrogen gas discharge pipe (6), multiple electrode plates (3) arranged side-by-side at certain intervals inside the case (2), and separators (4), which divide the inside of the case into multiple electrode chambers (5). In addition, a penetration hole (7) for expelling hydrogen gas is formed at an upper part of a separator (4) and a flow path (8), in which brine and sodium hypochlorite move, is formed within the flow path (8).

However, such electrolytic cells with the structure as shown in FIG. 2 have the following problems. The flow of brine is not smooth due to the fact that brine and sodium hypochlorite must run through each electrode chamber (5) via the flow path (8) existing in both upward and downward directions inside the separators (4). Especially, there is a need for cumbersome additional adhesion or welding work for fixing the electrode plates (3) or separators (4) each other. In addition, when the components are interconnected by welding or other adhesive inside the case (2), metallic materials or chemical components used for the interconnection may inhibit electrolysis of brine and may also deteriorate durability of the structure as a result of corrosion or short circuits at joints.

DETAILED DESCRIPTION OF THE INVENTION

Problems to be Solved

The present invention aims at providing a sodium hypochlorite production electrolytic cell that is free of a risk of corrosion or short circuits with easy-to-assemble and easy-to-disassemble features, in addition to greatly improving efficiency of electrolysis and durability of the electrolytic cell, by applying a simple convex-concavo assembly method for assembly or disassembly of each component installed inside the housing, without requiring welding work or adhesives.

Solutions to the Problems

The electrolytic cell for producing sodium hypochlorite described herein has a hollow housing including an internal space that is extended in its longitudinal direction, a brine supply hole installed at a lower portion of one side thereof, a brine discharge hole installed at an upper portion of the other side thereof; a separator that is tightly coupled to an inner wall of the housing and divides the inner space of the housing into multiple electrode chambers (C), the separator including a cut area forming a hydrogen discharge path (P) at an upper area in between the inner wall of the housing and the cut area, a rectangular space (S) passing through a central portion thereof, corresponding electrode plate insertion grooves formed at a certain interval on the upper and lower sides of the rectangular space (S), and fixation bar insertion grooves formed on edge portions that are closely coupled to the inner wall of the housing; electrode plates that are arranged serially or side by side inside the electrode chambers (C), maintaining a regular interval between each electrode plate, by each of the electrode plates being inserted into the electrode plate insertion grooves of the separator in a vertical direction; and separator fixation bars that are inserted into the fixation bar insertion grooves formed in the separator to fix the separator at the inner wall of the housing, separator fixation grooves being formed at locations where the separator is installed.

Effects of the Invention

The electrolytic cell disclosed herein is characterized in that all the components arranged inside the housing are coupled with each other by using a simple concavo-convex assembly method that facilitates easy and convenient assembly and disassembly of the structure, resulting in excellent effects in electrolysis performance and durability as a result of not using any metallic materials except for the electrode plates, thus eliminating a risk of corrosion or short circuits.

In addition, the electrolytic cell according to an embodiment of the present invention includes multiple separators separating electrode chambers (C) that are installed inside the housing, and a hydrogen gas discharge path (P) is installed between inner walls of the housing at an upper portion of the separators. Further, a space (S) for installing electrode plates is formed at a central portion of the housing, thus allowing brine and sodium hypochlorite to move smoothly between the electrode chambers (C) through the space (S), and hydrogen gas be quickly discharged through the hydrogen discharge path (P), thus preventing a risk of dangerous explosion due to the hydrogen gas.

Furthermore, according to an embodiment, since electrode plate insertion grooves are formed at a regular interval at the upper and lower portions of the space (S) of the separator, each of the electrode plates is inserted into a corresponding one of the electrode plate insertion grooves at the upper and lower portions, and the separator is tightly fixed to the inner wall of the housing by the separator fixation bar such that the regular intervals of the electrode plates can be maintained for a long period of time even at pressure levels of the brine ranging from 1 to 6 bar.

BRIEF DESCRIPTIONS OF THE DRAWINGS

Figure 3:
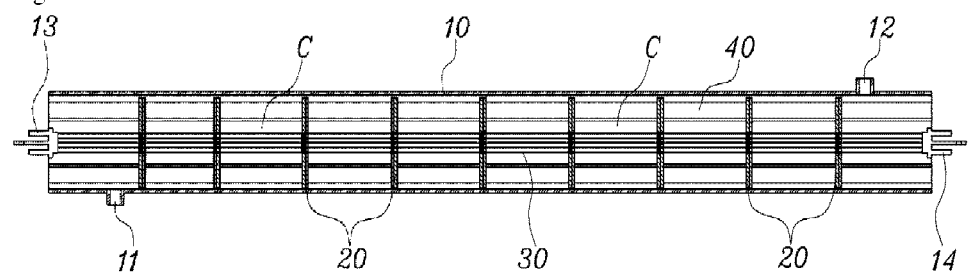
Figure 4:
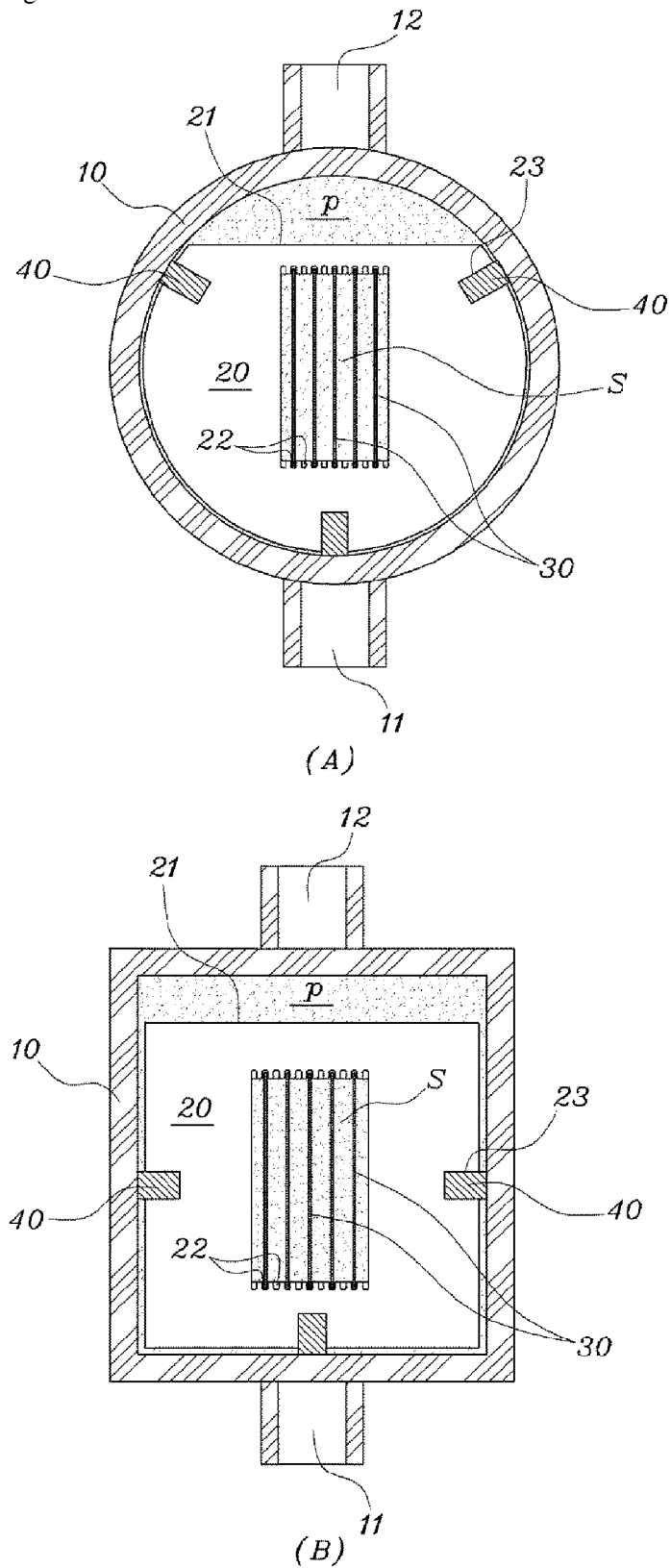
Figure 5:
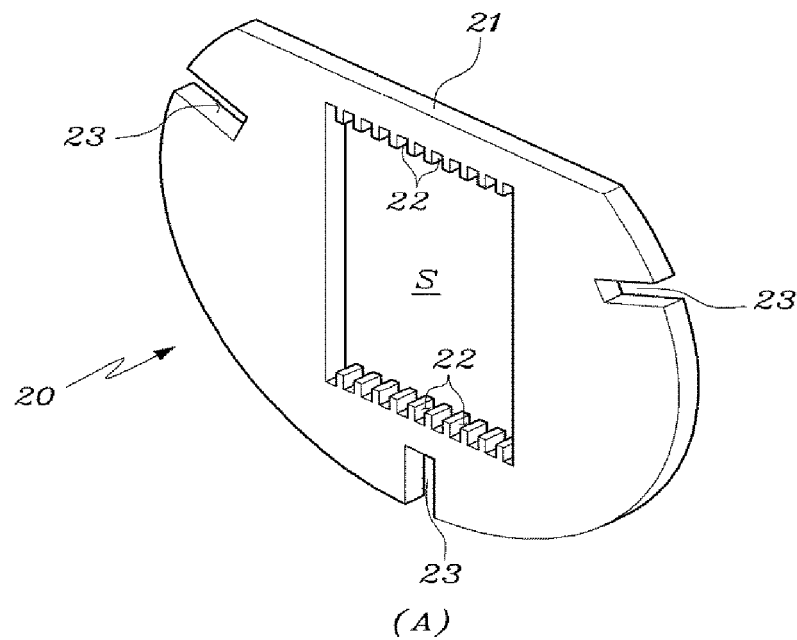
Figure 5:
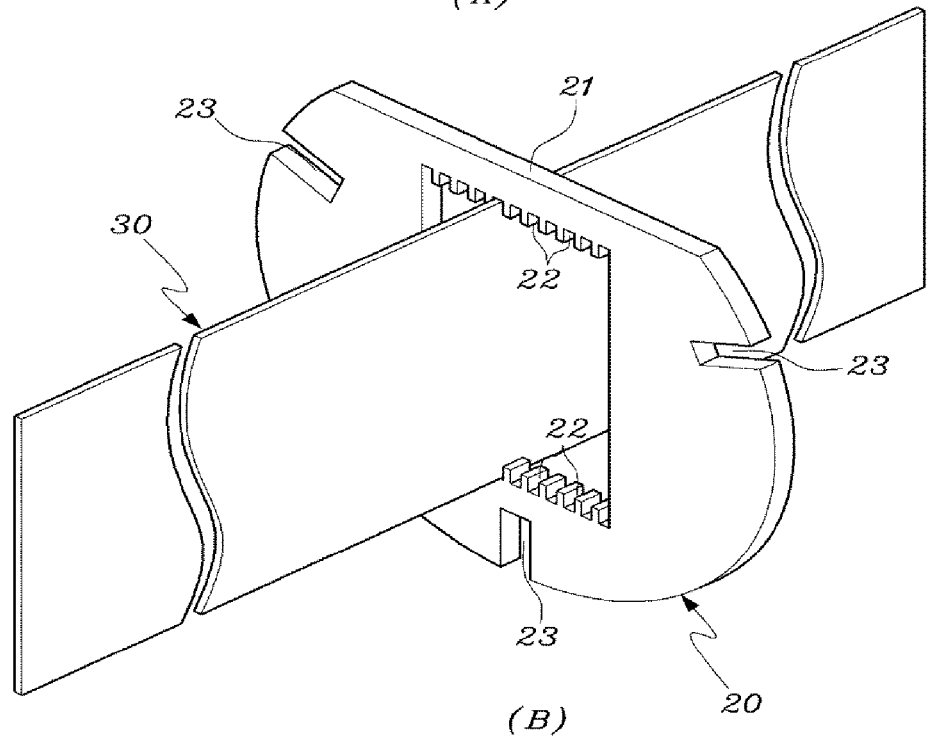
Figure 6:
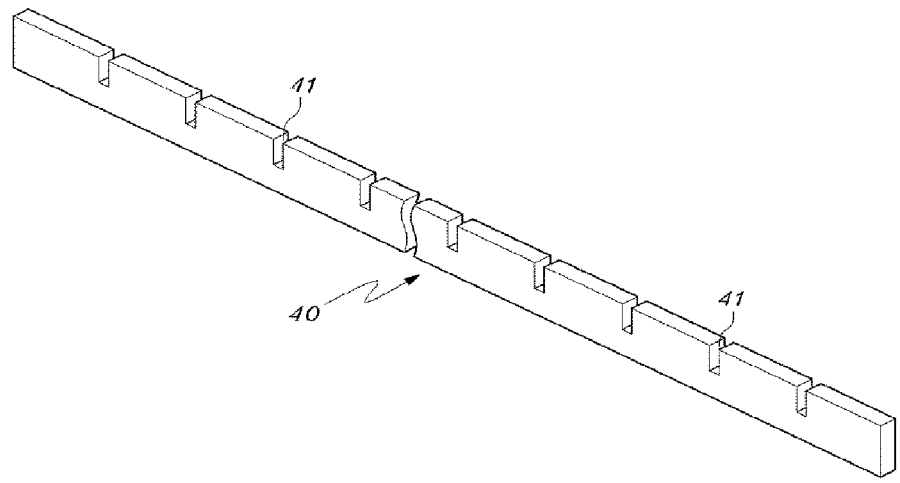
Figure 7:
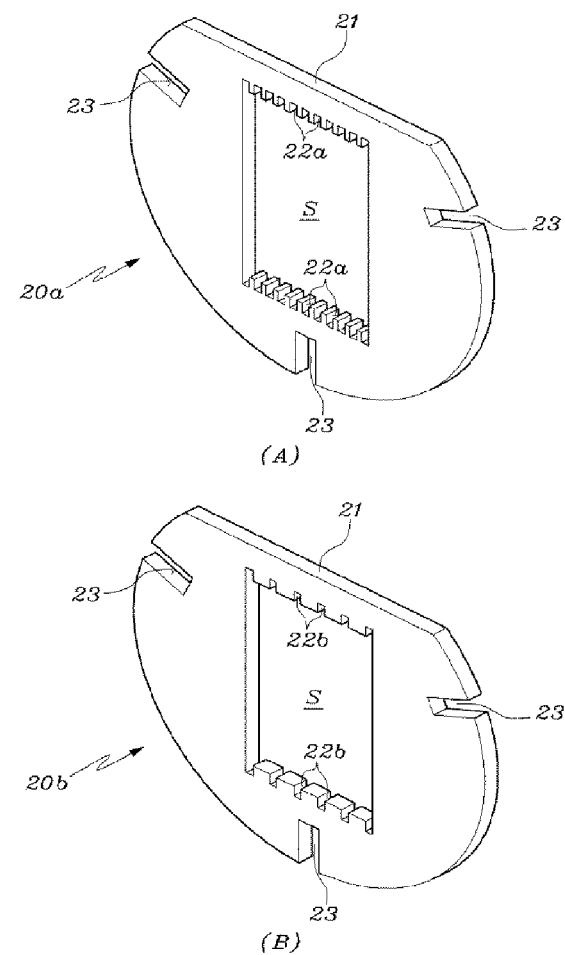
Figure 8:
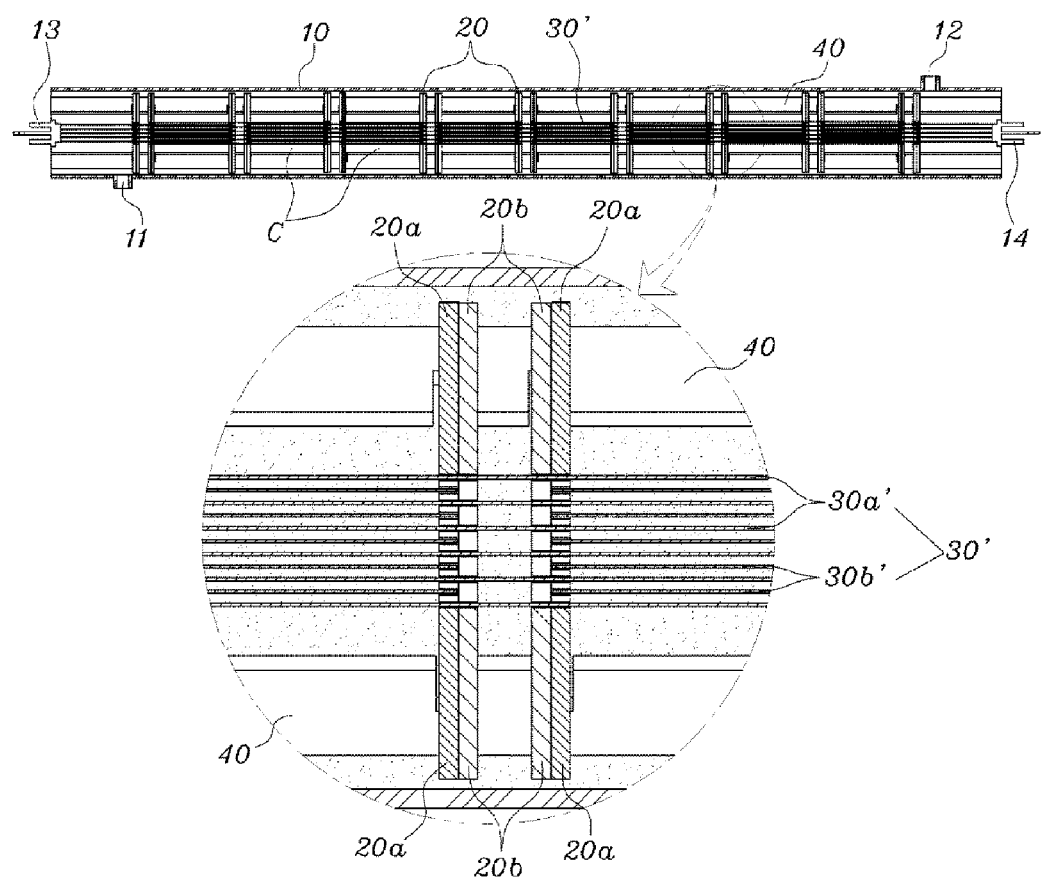

FIGS. 1 and 2 illustrate the structures of conventional electrolytic cells,

FIG. 3 is a longitudinal cross sectional view of the electrolytic cell according to an exemplary embodiment the present invention, FIG. 4 is a traversal cross-sectional view of the electrolytic cell shown in FIG. 3, FIG. 5 illustrates the structure of the separator (20) and the electrode plate (30), shown in FIG. 4, coupled to each other, FIG. 6 is an oblique view illustrating the structure of the separator fixation bar (40) shown in FIG. 4, FIG. 7 is an oblique view of the separators (20a, 20b) according to another exemplary embodiment of the present invention, and FIG. 8 is a longitudinal cross-sectional view of an electrolytic cell formed with the separators (20a, 20b) shown in FIG. 7.

DETAILED DESCRIPTION OF BEST MODES

The present invention will be described in detail as follows, referring to the drawings listed above. However, components that are apparent to those skilled in the art, well known in the art, or identical to known components in the conventional technology will be omitted even if such components are essential for the present invention. In addition, new terms or drawing numerals shall be assigned to each component of the present invention regardless of those used in FIGS. 1 and 2 which describe prior patent literature.

Referring to FIGS. 3 and 4, an electrolytic cell for producing sodium hypochlorite according to an exemplary embodiment of the present invention includes a hollow housing (10), a separator or a plurality of separators (2) and electrode plates (30) installed inside the housing (10), and separator fixation bars (40). Of these components, components other than the electrode pates (30), i.e., the housing (10), the separators (20), and the separator fixation bars (40), may be made of non-conductive materials, preferably injection molding materials such as polyvinyl chloride (PVC), fiberglass reinforced polypropylene, acrylonitrile butadiene styrene (ABS) resin, Teflon resin, and the like.

The housing (10) has a hollow structure that is commonly found in conventional electrolytic cells, an inner space extended in its longitudinal direction formed therein. The housing (10) further has a brine supply hole (11) installed at an upper end portion of one side thereof and a brine discharge hole (12) installed at an upper end portion of the other side thereof. In addition, an anode terminal (13) is installed at one side of the housing (10), and a cathode terminal (14) is installed at the other side of the housing (10). The positions of the brine supply hole (11) and the brine discharge hole (12) may be changed as necessary, and the number of the brine supply hole (11) and the brine discharge hole (12) may also be increased as necessary.

The separator (20) according to an embodiment of the present invention is tightly coupled to the inner wall of the housing (10) to divide the inner space of the housing (10) into multiple electrode chambers (C). Further, the separator (20) includes a cut area (21) forming a hydrogen discharge path (P) between the inner wall of the housing (10) and the cut area (21), as shown in FIG. 4. Furthermore, as shown in FIG. 5 (A), a rectangular space (S) passes through the central portion of the separator (20), and corresponding electrode plate grooves (22) are serially formed at a regular interval on the upper and lower sides of the space (S).

Also, fixation bar insertion grooves (23) are formed at edge portions of the separators (20) excluding the cut areas (21), that is, at edge portions that are tightly coupled to the inner walls of the housing (10). Although there are no limitations on the number of such fixation bar insertion grooves (23), the number of the fixation bar insertion grooves (23) may be 2~5, preferably 3.

The separators (20) may vary in shape depending on the cross-sectional shape of the housing (10), and may have a circular shape as shown in FIG. 4 (A), a rectangular shape as shown in FIG. 4 (B), or a polygonal shape (not shown in drawing). The number of the separators (20) used depends on the quantity of electrode chambers (C) and in general, 1 to 20 electrode chambers may be formed in each housing (10). Further, at least one separator (20) is installed inside the electrode chamber (C).

The structure of the electrode plate (30) has a rectangular plate shape as generally found in conventional electrolytic cells. According to an exemplary embodiment of the present invention, each electrode plate (30) is inserted vertically into each of the upper and lower electrode insertion grooves (22) of the separator (20) such that the electrode plate (30) passes through the upper space (S) in the longitudinal direction, neighboring separators (20) being separated at regular intervals, as shown in FIG. 5 (b).

In this embodiment, the spacing between one of the electrode plates (30) and the other one of the electrode plates (30) that is adjacent to the one electrode plate (30) is determined by the spacing between the electrode insertion grooves (22). In general, a spacing of 0.5~6 mm is formed when the brine is salt water, and a spacing of 0.5~8 mm is formed when the brine is sea water. When this range of spacing is maintained for the electrode plates (30), the current density for each electrode plate (30) remains within a range of 0.05~0.5 $A/cm^2$, consuming electric power in a range of 3.0~9.0 $Kw/KgCl_2$.

The base materials or substrate forming the electrode plates (30) are titanium, tantalum, tin, zirconium, stainless, nickel, and the like as is the case with general electrode plates. If all or part of such base material is coated with anodizing materials, they become anodic and if they are not coated, the base materials become cathodic. For example, ruthenium, iridium, platinum, rhodium, and palladium may be used as anodizing materials.

In the electrolytic cell shown in FIG. 3, electrode plates (30) are formed in such a way as to alternate anodes coated with an anodic material and cathodes that are not coated. Thus, the difference between the number of the anode plates and the number of the cathode plates is 1, resulting in n−1 number of electrodes.

The separator fixation bar (40) is a rectangular pole, as shown in FIG. 6, and is inserted into a fixation insertion groove (23) of the separator (20). Separator fixation grooves (41) are formed at respective positions where the separators (20) are installed. The separators (20) are fixated on the inner wall of the housing (10) by the separator fixation bars (40) such that the separators (20) are not twisted due to the pressure of brine, and moreover, the separator fixation bars (40) support the electrode plates (3) such that intervals between the electrode plates (30) are maintained in a secure manner for a prolonged period of time.

FIG. 7 illustrates a structure of a separator (20) according to another embodiment of the present invention. The separator (20) is formed with a type A separator (20a) having relatively narrowly arranged electrode plate insertion grooves (22) and a type B separator (20b) having relatively widely arranged electrode plate insertion grooves (22). In other words, the spacing between the electroplate insertion grooves (22a) of the type A separator (20a) is half the spacing between the electroplate insertion grooves (22b) of the Type B separator (20b). Therefore, one electrode plate insertion groove (22b) of the type B separator (20b) overlaps two electrode plate insertion grooves (22a) of the type A separator (20a) when the type A separator (20a) and the type B separator (20b) are tightly coupled with each other.

According to an exemplary embodiment of the present invention, electrode plates (30) cut to a specific length are used with type A separators (20a) and type B separators (20b). Such electrode plates (30) may be unipolar electrodes having either an anode or cathode function, or bipolar electrodes having both anode and cathode functions at a single electrode. Such bipolar electrode may be formed by coating an anodizing material only one side of a base material that is cut into left and right pieces having a specific length.

FIG. 8 illustrates the structure of an electrolytic cell, in which electrode pates (30) are installed on the type A separator (20a) and the type B separator (20b). As shown in the magnified view in FIG. 8, a type A separator (20a) and a type B separator (20b) are installed between the electrode chambers (C) by being tightly coupled with each other, the electrode plate (30a') being installed within two matching electrode plate insertion grooves (22a, 22b) in such a way as to penetrate the two separators (20a, 20b), and both ends of the electrode plate (30b') being inserted into only the electrode plate insertion groove (22a) of the type A separator (20a) where only the electrode plate insertion groove (22a) of the type A separator (20a) is installed. In doing so, one electrode (30') is arranged over the two electrode chambers (C), and both sides of each electrode plate (30') are firmly supported and prevented from being moved in either a leftward or rightward direction by being blocked by the type B separator (20b). In this embodiment, each electrode plate (30') is arranged such that the anodes and the cathodes intersect with an adjacent electrode plate (30').

The following is a mechanism and effects of the present invention, referring to the electrolytic cell illustrated in FIG. 3. Brine supplied from a brine supply device (not shown in the drawing) runs into the housing (10) through the brine supply hole (11). A preferred temperature of the brine ranges from 5 to 40° C., and it is preferable to maintain a pressure of 0.5~6 Bar. Then, electrolytic reactions that produce sodium hypochlorite and hydrogen gases are triggered by the brine passing through the electrode plates (30) arranged vertically in series. Then, the brine and sodium hypochlorite pass each electrode chamber (C) in order via the space (S) formed at the central portion of each electrode (30), and the hydrogen gas is eventually discharged through the brine discharge hole (12) after moving upward and passing through the hydrogen discharge path (P) at the upper portion of the separator (30). The brine and the sodium hypochlorite are also separated from each other by a separate device after being discharged out of the housing (10) through the brine discharge hole (12) at the upper portion of the housing (10).

The electrolytic cell according to the present invention may be assembled as follows: First, the electrode plates (30) are inserted into the electrode insertion grooves (22) of the separator (20) one by one, and then, the separator fixation grooves (41) of the separator fixation bar (40) are inserted into the fixation bar insertion grooves (23) of the separator (20); and finally, the assembly is completed by inserting the assembled structure into the housing (10) in the longitudinal direction.

Disassembly of the electrolytic cell may be performed by releasing the separator fixation bar (40), as well as the separator (20) and the electrode plates (30), out of the housing (10) by pulling the separator fixation bar (40) from the housing (10). Therefore, the electrolytic cell according to the present invention is easy to assemble and disassemble.

[Description of Reference Indicators in Drawings]
10: Housing
11: Brine supply hole
12: Brine discharge hole
13: Anode terminal
14: Cathode terminal
20, 20a, 20b: Separators
21: Cut area
22, 22a, 22b: Electrode plate insertion hole
23: Fixation bar insertion groove
30, 30', 30a', 30b': Electrodes
40: Separator fixation bar
41: Separator fixation groove
C: Electrode chamber
P: Hydrogen discharge path
S: Space

What is claimed is:

1. An electrolytic cell for producing sodium hypochlorite, comprising;
a hollow housing (10) having an inner space extended in its longitudinal direction;
a brine supply hole (11) installed at a lower end portion of one side of the housing;
a brine discharge hole (12) installed at an upper end portion of the other side of the housing;
a plurality of separators (20) tightly coupled to an inner wall of the housing (10) and dividing an inner space of the housing (10) into multiple electrode chambers (C);
a cut portion (21) positioned at an upper end portion of each of the plurality of separators, forming a hydrogen discharge path (P) between the inner wall of the housing and the cut portion (21), and further forming a rectangular space (S) penetrating through a central portion of each of the plurality of separators;
a plurality of electrode plate insertion grooves (22) formed in a regular interval at an upper side and a lower side of the space (S);

a plurality of fixation bar insertion grooves (23) formed on edge portions of each of the plurality of separators which are tightly coupled to the inner wall of the housing (10);

a plurality of electrode plates (30) that are arranged side by side inside the electrode chambers (C) such that the regular interval between each electrode plate is maintained by each electrode plate being vertically inserted into corresponding upper and lower electrode plate insertion grooves (22) formed at the plurality of separators (20); and a plurality of separator fixation bars (40) with a plurality of separator fixation grooves (41) formed at positions where the plurality of separators (20) are installed, wherein the plurality of separator fixation bars are inserted into the plurality of fixation bar insertion grooves (23) of the plurality of separators (20) to fixate the plurality of separators (20) at the inner wall of the housing (10) wherein the plurality of separators comprise type A separators (20a) with narrow electrode plate insertion grooves (22a) and type B separators (20b) with wide electrode plate insertion grooves (22b), wherein the spacing between the electroplate insertion grooves (22a) of the type A separator (20a) is half the spacing between the electroplate insertion grooves (22b) of the Type B separator (20b), such that two electrode plate insertion grooves (22a) of the type A separator (20a) overlap one electrode plate insertion groove (22b) of the type B separator (20b); and electrode plates cut to a specific length are alternately inserted into the electrode plate insertion grooves of the type A and type B separators such that anodes and cathodes intersect.

2. The electrolytic cell of claim 1, wherein the housing (1), the plurality of separators (20), and the plurality of separator fixation bars (40) are made of non-conductive materials.

3. The electrolytic cell of claim 1, wherein the plurality of separators (20) include 2~5 fixation bar insertion grooves (23).

4. The electrolytic cell of claim 1, wherein the electrode plates (30') are bipolar electrodes, each of the electrode plates having both an anode and a cathode.

* * * * *